July 15, 1958 W. DEGEN 2,843,362
EXCAVATION IMPLEMENT
Filed Aug. 20, 1954
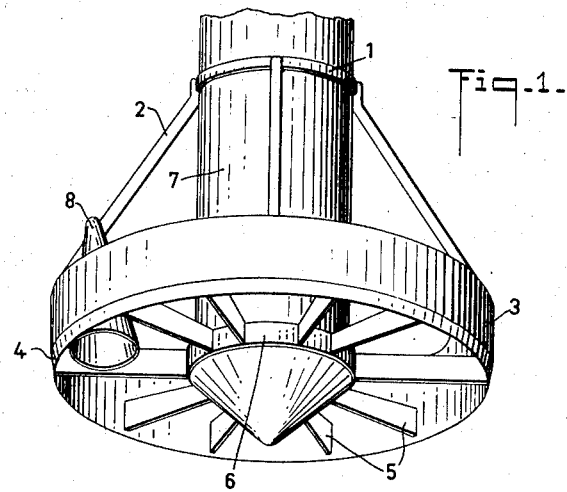
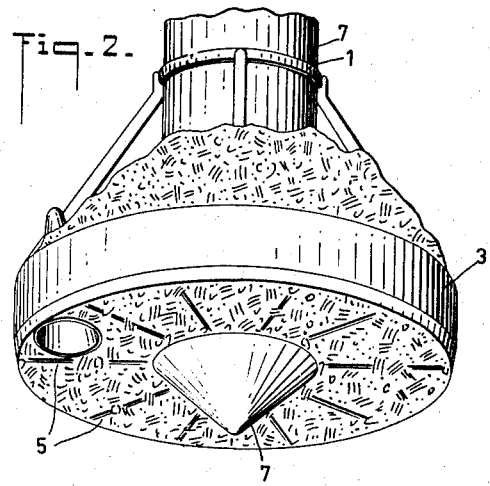
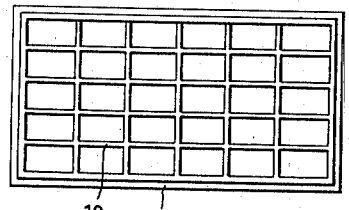
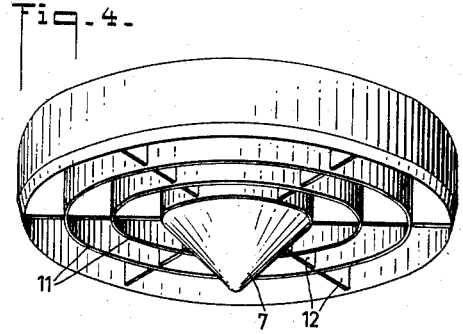
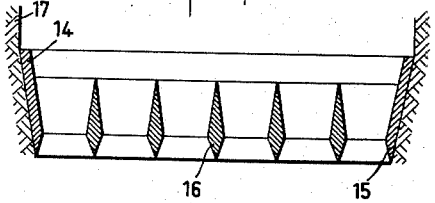
INVENTOR:
WILHELM DEGEN
BY
ATTORNEY

United States Patent Office 2,843,362
Patented July 15, 1958

2,843,362

EXCAVATION IMPLEMENT

Wilhelm Degen, Frankfurt am Main, Germany

Application August 20, 1954, Serial No. 451,156

7 Claims. (Cl. 255—61)

The present invention refers to an excavation implement, particularly for excavating materials with components which are difficult to separate. The implement may be used, for instance, for excavating ditches, for picking up adhesive or tenacious piled material, for the unloading of ships and like operations.

The implement comprises essentially a frame, a plurality of wedge-shaped cutters vertically mounted on the frame and defining vertical chambers therebetween for holding excavated material, and a shaking device coupled to the frame and/or to the cutters.

The cutters work their way into the soil or like material by means of the shaking movement. Utilizing the static friction and the adhesion of the material particles packed between the cutters, the packed material may be drawn from or torn off the ground or surrounding material, especially after the shaking movement has been interrupted.

The implement may be attached to a suitable supporting device which may be pivoted out of the position of the excavation to transport the material packed between the cutters to a desired location where it may be discharged by again imparting a shaking movement to the implement and thereby shake the material out of the implement.

The excavating implement according to the invention may be a hollow body, for instance a cylinder open at the bottom, the outer wall of which is provided with lower cutting edges and whose cross section corresponds to the cross section of the desired excavation. This outer cutter may be sub-divided by radial cutters arranged inside the outer wall. The outer wall may also be a rectangular frame sub-divided into rectangular sectors or chambers by a plurality of intersecting intermediate cutters running parallel to the walls of the outer frame. The latter implement may be advantageously used for excavating narrow ditches. If desired, the inner cutters may be of different height and the outer cutter may be higher than the inside cutters. As a rule, the inside cutters are vertical but they may also be inclined to prevent packed material from falling out of the implement when the material is conveyed from the excavation site. For this purpose, the outer cutter or wall may also be downwardly and inwardly inclined.

An upwardly tapering pipe may be arranged in the implement, which connects the space above and below the cutters and thus faciiltates tearing off the material gripped within the implement from the ground. When the implement pierces the material to be excavated, the tapered or funnel-shaped pipe will also be filled with material but when the implement is lifted, the material within the pipe will remain stationary because of the pipe's shape so that air or water can flow into the pipe from the top to the bottom to offset the vacuum ocurring underneath the implement. Tearing off will be faciliated if compressed air or water under pressure is introduced through this pipe under the surface of the torn-off material.

Certain embodiments of the excavating implement according to the invention are illustrated in the accompanying drawing.

Fig. 1 is a perspective view from the bottom of an implement according to one embodiment;

Fig. 2 is the same view when the implement is filled;

Fig. 3 is a schematic bottom view of a rectangular cutting frame useful particularly for excavating narrow ditches;

Fig. 4 is a view of a cutting frame similar to the frame of Figs. 1 and 2 but having additional concentric cutters; and Fig. 5 is a vertical section of a cutting frame similar to Fig. 3 but with double-wedge-shaped inner cutters and an inwardly and downwardly inclined outer cutting wall.

Referring now to Fig. 1, the excavation implement is shown consisting of a supporting frame comprising a clamp 1 and radial struts 2. Cylindrical steel band 3 with its sharpened lower edge 4 forms the outer cutter wall of the implement and is attached to and supported by the struts 2. Radial inner cutters 5 are connected to the outer cutter and a hub ring 6, forming radial chambers within the implement. The inner cutters are not as high as the outer cutter wall and are inwardly spaced from the cutting edge 4 whereby they act subsequently thereto. A shaker 7 of conventional construction is connected to the implement by removably mounting hub 6 and clamp 1 thereon, for instance by means of screws (not shown).

This implement operates as follows:

When the implement is lowered onto the ground to be excavated, for instance, or on material heaped on a boat for the purpose of unloading the ship, the outer cutting wall sinks down into the material due to the shaking motion imparted to the implement by the shaker and the material is pushed upwardly through the inner chambers. After discontinuing the shaking, the packed material will be lifted by the pulling power of the implement as the same is raised and the mateiral held by its own cohesion and frictionally between the cutters will be drawn or torn from its surrounding material. The excavated material will be held within the vertical chambers of the implement until it is shaken out by actuating the shaker again.

The upwardly tapering funnel-shaped pipe 8 serves to permit air or water to flow from above the cutting chambers to the bottom as soon as the implement is lifted enough to empty the short pipe of material therein.

Fig. 3 illustrates an implement with a rectangular outer cutting wall 9 which corresponds to wall 3 of the embodiment of Figs. 1 and 2, and which is attached to a shaker by means of a supporting structure, such as clamp 1 and struts 2 of Fig. 1. The implement is subdivided into a plurality of rectangular chambers by inner cutters 10. Except for the shape of the cutters, which makes the implement particularly suitable for the excavation of ditches or trenches, this embodiment of the invention operates exactly like that of Fig. 1.

The embodiment of Fig. 4 is similar to that of Fig. 1, except that the radial cutters 12 are supplemented by a plurality of concentrically arranged cutters 11. In every other respect, this embodiment is constructed and operates like that of Fig. 1.

Fig. 5 schemtically illustrates specific shapes of cutters applicable either to the embodiment of Fig. 1 or 3. In this embodiment, the outer cutter wall 14 is inwardly and downwardly inclined, being provided with a lower cutting edge 15. Obviously, either the cylindrical outer wall 3 or the rectangular outer wall 9 may be inclined like wall 14. The wall could also be polygonal, if desired. With such an outer wall, the implement will help to increase the stability of the surrounding material 17 by compressing it while excavating. The inside cutters 16 are shown as tapering toward both ends to form frusto-conical chambers above the cutting edges. Again, any of the illustrated inner cutters 5, 9 or 12 may have the cross section of cutters 16. With this latter cutter arrangement, the internal friction of the material will usually suffice to hold it in the chambers during excavations and conveying even when loose material is involved.

I claim:

1. An implement for excavating and removing compact materials, comprising a shaking device, a vertically downwardly pointing cutting tool and means for securing the cutting tool to the shaking device, the cutting tool including a circumferential downwardly pointing cutting member defining a laterally closed chamber and adapted to encompass the material to be excavated and a plurality of downwardly pointing inner cutting members arranged in said chamber and attached to the outer cutting member, the cutting members forming a plurality of compartments in said laterally closed chamber therebetween for holding the excavated material during removal.

2. The implement of claim 1, wherein the inner cutting members are radially arranged within the outer cutting member.

3. The implement of claim 1, wherein the inner cutting members are arranged at right angles to each other, forming rectangular compartments therebetween.

4. The implement of claim 1, wherein the inner cutting members include radially arranged members and additional cutting members arranged concentrically in relation to the outer cutting member.

5. The implement of claim 1, wherein the outer cutter is of greater height than the inside cutters and protrudes below the inside cutters.

6. The implement of claim 1, wherein the vertical cross section of the inner cutters has a thickened portion, the cutters tapering toward both ends.

7. The implement of claim 1, wherein said circumferential cutting member tapers downwardly whereby the interior cross section of the chamber widens toward the top.

References Cited in the file of this patent

UNITED STATES PATENTS

| 48,823 | May | July 18, 1865 |
| 212,218 | Haas et al. | Feb. 11, 1879 |
| 795,433 | Foust | July 25, 1905 |
| 1,043,885 | Welch | Nov. 12, 1912 |
| 1,674,392 | Flansburg | June 19, 1928 |
| 2,664,273 | Merrick | Dec. 29, 1953 |

UNITED STATES PATENT OFFICE

CERTIFICATE OF CORRECTION

Patent No. 2,843,362                  July 15, 1958

Wilhelm Degen

It is hereby certified that error appears in the above numbered patent requiring correction and that the said Letters Patent should read as corrected below.

In the heading to the printed specification, between lines 4 and 5, insert the following:

-- Claims priority, application Germany August 20, 1953 --

Signed and sealed this 7th day of October 1958.

(SEAL)

Attest:
KARL H. AXLINE

Attesting Officer

ROBERT C. WATSON
Commissioner of Patents